Sept. 18, 1923.  1,468,364

C. O. JOHNSON

AUTOMOBILE AND VEHICLE TRACK FOR BRIDGES

Filed Dec. 27, 1922     2 Sheets-Sheet 1

Inventor
Carl O. Johnson

By Blackwood Bros.,
Attorneys.

Sept. 18, 1923.

C. O. JOHNSON

AUTOMOBILE AND VEHICLE TRACK FOR BRIDGES

Filed Dec. 27, 1922  2 Sheets-Sheet 2

Inventor
Carl O. Johnson
By Blackwood Bros.,
Attorneys.

Patented Sept. 18, 1923.

1,468,364

UNITED STATES PATENT OFFICE.

CARL O. JOHNSON, OF HAVELOCK, NEBRASKA.

AUTOMOBILE AND VEHICLE TRACK FOR BRIDGES.

Application filed December 27, 1922. Serial No. 609,206.

*To all whom it may concern:*

Be it known that I, CARL O. JOHNSON, a citizen of the United States, residing at Havelock, in the county of Lancaster, State of Nebraska, have invented certain new and useful Improvements in Automobile and Vehicle Tracks for Bridges; and I do declare the following to be a full, clear, and exact description of the invention, such as will enable others skilled in the art to which it pertains to make and use the same.

My invention relates to improvements in automobile or vehicle tracks, or the so-called "traffic strips," more particularly designed for use as a track or runway on a bridge for the use of automobiles and other vehicles.

The invention consists in the several features and in the construction, combination and arrangement of such features as is more fully hereinafter described and claimed.

Most bridges now in general use have floors made of wooden planks, which wear out rapidly, from traffic and exposure to the elements, and more rapidly become rough and uneven and often sliver badly. The knots are harder than the surrounding wood, which wears away faster than the knots, thus rendering the surface uneven and bumpy, which condition cannot be prevented or remedied and renders travel unpleasant and uncomfortable and is injurious to vehicles and the bridge. Under heavy traffic fir planks have to be replaced often each year and even white oak planks are worn out in two years. Thus the present practice of using plank floors on bridges is unsatisfactory on account of the great expense of frequent renewals, the damage to the bridge and passing vehicles from jars and vibrations, the slowing up of travel and discomfort to the traveling public. To avoid these objections, sometimes a track is made for each wheel by placing plank end to end lengthwise of the bridge, but this is unsatisfactory for many reasons. The contact or slipping of the tires or outer rims of the wheels of motor driven vehicles, where the power is applied through the wheels, even at moderate speed, causes the planks to wear very fast as well as to become rough and uneven requiring greater power to propel the vehicle and shortening the life of both vehicles and bridge. Many kinds of lumber used for flooring bridges sliver badly thus adding another danger to the tires of automobiles. These planks are generally three inches thick and should the wheels run or slip off, it is difficult to get them back on again and if the front wheels are turned sufficiently to remount these plank tracks they go over and off the other side and sometimes entirely off the bridge.

Many steel bridges now in use are not strong enough to support cement floors so that wooden planks are necessarily used thereon. After a short period of service, these planks become rough and uneven from wear thus producing depressions and bumps which are objectionable in every way, reducing speed of travel and making it uncomfortable for passengers and also damaging the vehicles and increasing the strains and vibrations in the several members of the bridge, which tend to shorten its life and finally to destroy the bridge itself.

The object of my invention is to eliminate the above named objections, faults and disadvantages and others by providing a track or runway for a bridge which is free from such objections.

A further object is to provide a track or runway which will on being properly laid upon the floor of a bridge not only furnish a smooth, durable surface for the wheels of vehicles and have sufficient resistance to retain or hold the wheels on the tracks, but at the same time will reduce the strains and vibrations to a minimum degree and strengthen the structure of the bridge and extend its life.

A further object is to provide a track or runway for a bridge which will practically never wear out, be substantially level and smooth and which will prevent all jolts and vibrations to vehicles passing over the same.

A still further object is to provide a track or runway for a bridge which is simple, inexpensive and durable in construction, attractive in appearance and very effective in use.

Referring to the drawings:—

Figure 1:
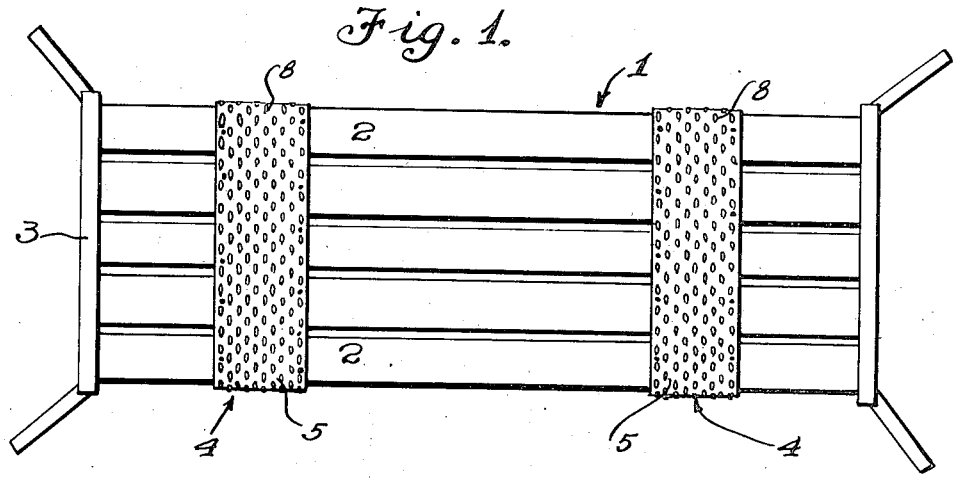
Fig. 1 is a top plan view of a bridge with my invention applied thereto or installed thereon.
Figure 2:
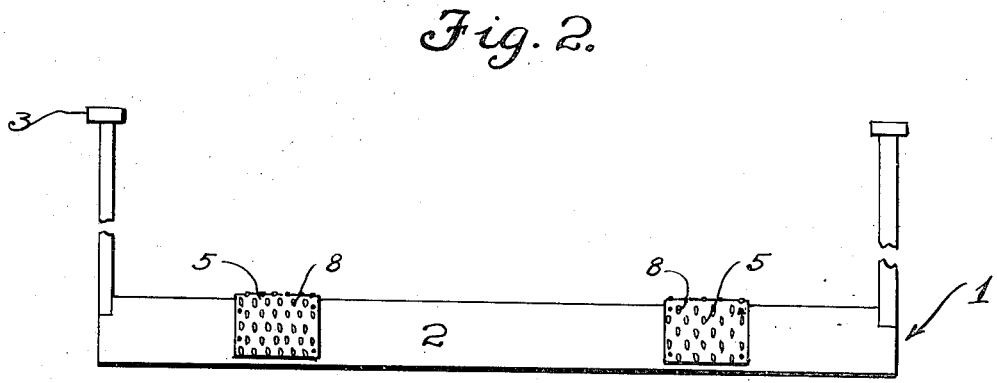
Fig. 2 is a side view.
Figure 3:
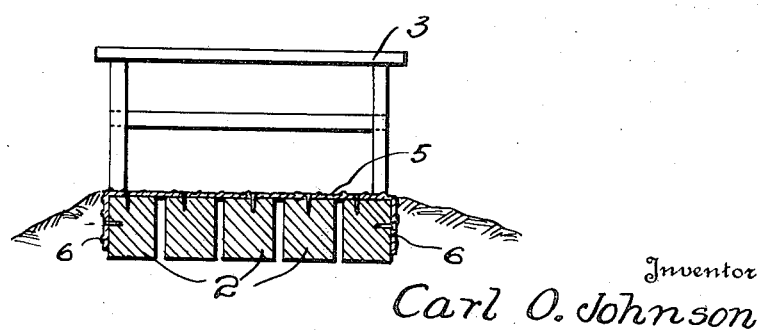
Fig. 3 is a sectional view of a section of the track or runway.
Figure 4:
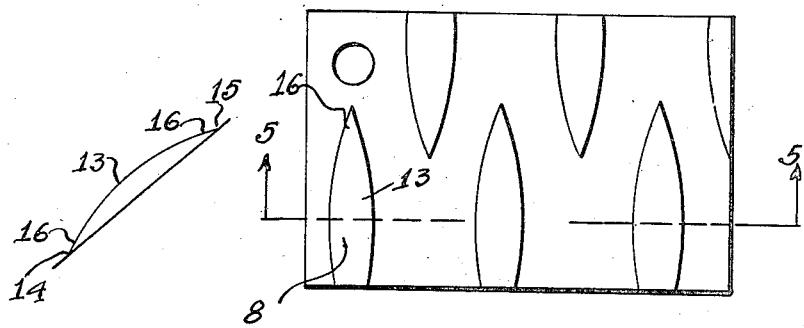
Fig. 4 is a top plan view of a portion of the track.
Figure 5:
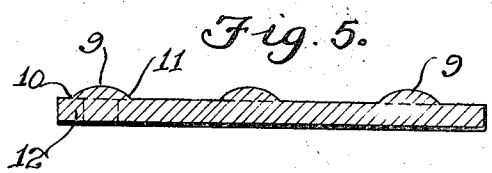
Fig. 5 is a cross-section taken on the line 5—5 of Figure 4.

In the drawings, in which similar reference characters denote similar parts throughout the several views, 1 represents an ordinary wooden bridge having the usual spaced apart floor planks 2 and side rails 3, and 4 is my improved track or runway, preferably made of steel or other metal, but which may be made of any material which is suitable or will serve the purpose.

The track or runway may be made of any desired width, length or thickness to suit the different conditions of use, but ordinarily the track will be made of steel three sixteenths of an inch in thickness, the length being dependent on the length of metal which it is convenient to use and the width varying from about fifteen to twenty four inches.

The track 4 comprises two similar strips 5, 5, of a length to correspond to the length of the bridge they are to be placed or used on, and the opposite ends 6 of each strip are bent downward, at substantially a right angle, and spiked, screwed or otherwise secured to the outermost planks of the bridge.

Each of the strips 5 of the track 4 is provided with a series of projections or protuberances 8, which are arranged longitudinally so as to break joint with one another and each projection 8 is curved or rounded upward, as at 9, laterally from the point 10 to the point 11 of the upper surface of its base 12.

Each of the strips 5 also curves upwardly in a longitudinal direction, as at 13, from the point 14 to the point 15 of the base 12 and each terminates in a sharp point 16 at each end.

Where there is a reasonable amount of travel over the tracks the traffic will prevent the upper surface or top of the strips from rusting or becoming corroded, and the lower or under surface may have a coat of suitable paint or other substance applied thereto to prevent rust or corrosion.

The strips 5, in addition to their other functions, serve to retain and hold the floor planks together and thereby brace and strengthen the bridge, and such strips may be used equally as well on earth, cement, macadam or other roadbed substance, instead of wood as herein set forth.

Strips 5 are designed to be used in pairs, two for each track on a bridge, but of course additional tracks may be provided if found desirable.

Figure 6:
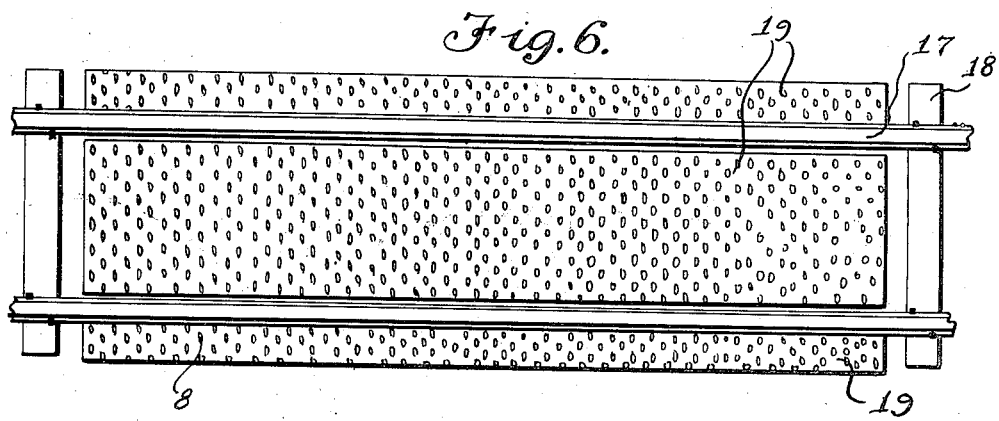
Fig. 6 is a top plan view showing the invention as it appears when used in connection with railway crossings to obviate the slipping of horses and the skidding of automobiles at such point.

In Figure 6 of the drawings, as has been described previously, the invention is shown as it appears when used at a railway crossing, 17 being the rails, 18 the ties and 19 the traffic strips arranged between and on either side of the rails.

I do not wish to be understood as limiting myself to the specific details of construction and arrangement as herein described and illustrated, as it is manifest that variations and modifications may be made in such features of construction and arrangement, in the adaptation of the device to the various conditions of use, without departing from the spirit and scope of my invention and improvements. I therefore reserve the right to all such variations and modifications as properly fall within the scope of my invention and the terms of the following claim.

What I claim is:—

In a vehicle track for bridges, spaced metal strips or tracks secured to the floor of the bridge, a plurality of lines of parallel projections thereon pointed at each end and all extending longitudinally of said metal strips or tracks and breaking joint with one another, said projections curved outwardly from each end and having their sides and ends curved upwardly to a point at the middle of the projections.

In testimony whereof I have affixed my signature.

CARL O. JOHNSON.